United States Patent [19]

Nanigian

[11] Patent Number: 4,729,798
[45] Date of Patent: Mar. 8, 1988

[54] LONG LIFE RIGHT ANGLE THERMOCOUPLE WITH CONSTANT CONTACT PRESSURE

[76] Inventor: Jacob Nanigian, 622 S. L-St., Lake Worth, Fla. 33460

[21] Appl. No.: 947,860

[22] Filed: Dec. 30, 1986

[51] Int. Cl.⁴ ............................................. H01L 35/28
[52] U.S. Cl. ..................... 136/221; 136/235; 374/179
[58] Field of Search ............... 136/221, 226, 230, 235; 374/179; 29/573

[56] References Cited

U.S. PATENT DOCUMENTS

| 3,156,117 | 11/1964 | Benzinger | 374/179 X |
|---|---|---|---|
| 3,283,580 | 11/1966 | Nanigian et al. | 73/359 |
| 3,395,050 | 7/1968 | Senbokuya | 136/221 |
| 3,417,618 | 12/1968 | Morrisette | 136/230 X |
| 3,573,995 | 4/1971 | Senbokuya | 136/221 |
| 3,681,990 | 8/1972 | Barrett et al. | 73/343 |
| 4,101,343 | 7/1978 | Feichter et al. | 136/230 |
| 4,174,631 | 11/1979 | Hammerslag | 374/179 |
| 4,454,370 | 6/1984 | Voznick | 136/221 |
| 4,527,005 | 7/1985 | McKelvey et al. | 136/221 |

FOREIGN PATENT DOCUMENTS

| 2642544 | 3/1978 | Fed. Rep. of Germany | 136/230 |
|---|---|---|---|
| 48383 | 4/1977 | Japan | 374/179 |
| 48384 | 4/1977 | Japan | 374/179 |
| 620838 | 7/1978 | U.S.S.R. | 374/179 |

Primary Examiner—Deborah L. Kyle
Assistant Examiner—Brian S. Steinberger

[57] ABSTRACT

An improved right angle thermocouple provides for constant pressure sensing tip contact achieved by means of a coiled and thus resiliently biased junction wire structure extending from the mounting base, preferably in the form of a circular loop of flattened ribbon shaped dissimilar metallic wires overlapped at a welded sensing tip. This sensing tip is protected by a spring biased protective shield of low thermal conductivity material having a few prongs extending from its open end for contact with the surface to be monitored in a manner that causes little thermal modification that would result in an erroneous temperature reading. The shield member, preferably cylindrical in shape, moves between two stops, one surrounding and protecting the sensing tip from physical damage and the other withdrawing just enough to permit the resilient bias of the sensing tip loop to establish a constant measurement contact pressure. The sensing tip is an unsupported loop of wire terminating in a welded junction of two ribbon elements so coiled as to produce a spring bias establishing the contact pressure of the sensing tip with the surface to be monitored, thereby avoiding temperature errors resulting from either thermal bleedoff from the heat source being sensed or from variations of contact pressure at the sensing tip.

7 Claims, 2 Drawing Figures

LONG LIFE RIGHT ANGLE THERMOCOUPLE WITH CONSTANT CONTACT PRESSURE

TECHNICAL FIELD

This invention relates to thermocouples, and more particularly it relates to the physical mounting of thermocouple sensing tips for protecting them from damage and for urging them into contact with a surface to be monitored with a constant contact pressure.

BACKGROUND ART

One particularly advantageous thermocouple design is the Right Angle Thermocouple, one embodiment of which is set forth in U.S. Pat. No. 3,283,580. This design features a thermal junction disposed at right angles to the longitudinal axis of the thermowell base structure in which the thermocouple is mounted, and generally supported by an extending insulating rod upon which the thermocouple junction sensing tip rests. The dissimilar metals in the vicinity of the junction are flattened ribbon-like strips. These are held parallel to the plane of the heat source or surface being monitored so that both the thermal junction and the ribbons are heated simultaneously to reduce conduction errors. The ribbon elements allow fast times to equilibrium temperature with a maximum surface contact area offered to the heat source. Thus response times of a few milliseconds is achieved.

However, there are several disadvantages of prior art right angle thermocouple embodiments. The thin ribbon structure is so fragile that damage to the junction is often encountered in contacting the object to be monitored. Also errors occur in temperature readings because of variations in contact pressure of the sensing tip from time to time. In storage or transit, the junction is easily damaged if it brushes against some other object.

Other problems and disadvantages are encountered with the prior art right angle thermocouple structures. Thus, the supports or mounting assembly for the ribbon junction elements may serve as a heat sink or temperature modifier that contacts the heat source or surface being monitored and thus introduce errors into the temperature readings.

It is therefore a primary objective of the present invention to improve the state of the art of right angle thermocouples. A further objective is to resolve the aforementioned problems and disadvantages of the prior art thermocouples. Other objects, features and advantages of the invention will be found throughout the following description, drawing and claims.

DISCLOSURE OF THE INVENTION

In the present invention the delicate junction of ribbon elements is protected by a retractable, spring loaded protective open ended cylindrical shield that surrounds the sensing tip. It is attached to the thermocouple mounting structure so that when the sensing tip is advanced toward the heat source or surface to be monitored, the open end of the shield first contacts that surface and retracts the shield against its spring bias. Thus, in storage and non-sensing handling of the thermocouple, the sensing tip is protected against damage from contact with foreign objects.

To prevent thermal sensing errors contributed by the thermocouple, the shield is of a low thermal conductivity material such as the plastic material sold under the trademark TEFLON. This minimizes any change of the temperature caused by the presence of the thermocouple. Furthermore, the open cylindrical end of the shield that contacts the surface being monitored is scalloped to make contact at a few prong positions, such as five, which are distributed about the cylindrical shield circumference at its open end.

Stops on the mounting structure limit the shield movement between two extremes, one with the thermocouple sensing tip in contact with the heat source, and the other with the shield extended to protect the sensing tip.

The thermocouple structure further uniquely controls the contact pressure of the sensing tip against the surface being monitored. Thus, the thermocouple wires and the ribbon elements at the junction are formed into a self spring biased loop, preferably circular, without interior loop supporting structure, so that the resiliency or spring action of the loop itself produces the contact pressure of the sensing tip against the surface being monitored. This gives the two major advantages, (1) that there is no support structure serving to modify the temperature at the sensing tip or acting as a conductor at the surface being monitored, and (2) that there is always a known contact pressure of the sensing tip against the surface being monitored so that temperature readings will not vary with contact pressure.

The retractable shield cooperatively reacts in this respect by permitting, at its retracted stop position, just enough of the sensing tip spring loop to protrude that the resiliency of the spring action is known and is protected against distortion.

Thus the improved thermocouple of this invention is rugged and more capable of rough handling during use, storage or transit and furthermore is more accurate by eliminating causes of temperature sensing errors found in prior art thermocouples.

The spring biased temperature sensing probes of U.S. Pat. Nos. 3,681,990, Aug. 8, 1972 to C. E. Barrett, et al. and 4,527,005, July 2, 1985 to T. E. McKelvey et al. do urge the sensing tip against the surface to be monitored with a known spring bias force. However the spring is not formed by the thermocouple wires, nor is the sensing tip unsupported so that there is no temperature variation cause by contact of support structure with the heat source at the point of measurement or immediately adjacent thereto. Thus, the prior art structure is different and the mode of thermal sensing is different so that the accuracy of the thermocouple of this invention is not attainable, nor the ruggedness, nor the simplicity of construction and assembly.

THE PREFERRED EMBODIMENT

Figure 1:
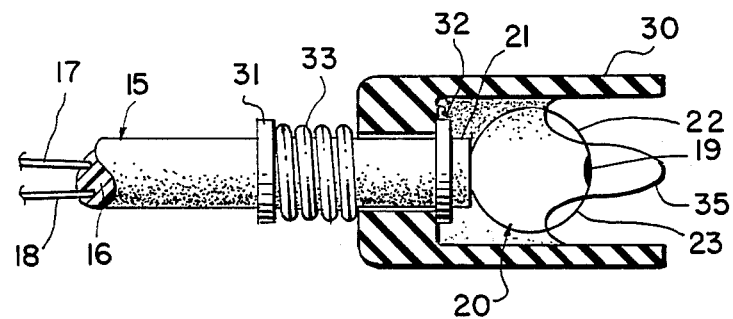
FIG. 1 is a side view, partly in section, of a thermocouple sensing tip mount constructed in accordance with this invention.
Figure 2:
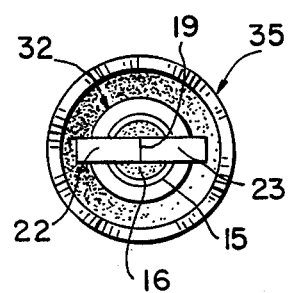
FIG. 2 is an end view of the thermocouple looking into the open cylindrical end at the thermocouple junction.

The thermocouple mounting structure is typically an outer metal tubing 15 inside which an oxide ceramic insulation sheath 16 protects the two wires 17, 18 of dissimilar metal from which the thermocouple junction 19 is fashioned. The wires 17, 18 are at the cold end and lead off to the reference junction and the indicating instrument. At the hot, sensing tip, end 19, the dissimilar metals are rolled or flattened into ribbons of a thickness of about 0.0035 inch and a width of about 0.100 inch. These ribbons are overlapped and welded to form the measuring junction at the sensing tip 19.

In accordance with this invention, the sensing tip comprises a shaped thermocouple wire junction temperature sensing member in the form of an unsupported loop 20 extending from the sensing end of the mounting structure 21. This loop may simply be a circular loop 20, as shown, which by means of the thermocouple wires and junction ribbon elements 22, 23 form a resilient spring biased structure that gives when the sensing junction 19 contacts a heat source surface to be monitored. This provides a known and constant probing pressure if the coil 20 is not moved outside its elastic limit, as the sensing tip is moved into the heat source surface. Structure for keeping the movement within proper limits is later discussed.

This resilient unsupported sensing tip loop provides the advantages of both assuring a constant predetermined sensing pressure to avoid variations of readings or temperature errors and a structure with minimal thermal contact with the heat source surface that can change its temperature, as is the case with the prior art structure which has a sensing junction supported by a ceramic post or the like extending in the vicinity of the sensing junction tip.

A retractable shield 30, comprising an open ended cylindrically shaped member, envelops and surrounds the sensing tip 19 when in its extended position, as shown in FIG. 1. Thus the junction at 19 is not subjected to contact with foreign objects during storage or transit which might damage the delicate junction, as is the case with prior art right angle thermocouple structures.

The shield 30 is biased by spring 33 to normally rest in a storage position against stop 32, thereby surrounding the sensing tip 19. When retracted by pressure at the open cylinder end against the surface to be monitored, the movement is limited by stop member 31 so that the sensing tip protrudes and need be flexed somewhat against its natural spring bias caused by the coil structure 20. This action then assures a known and constant contact pressure of the sensing tip.

The shield body 30 is of a low thermal conductivity material such as the plastic sold under the trademark TEFLON, so that it will not tend to affect the temperature of the heat source at the sensing tip 19 and cause sensing errors. To further reduce any possible heat losses the open end of the cylindrical shield has a few (five) prongs 35 extending to limit the contact surface at the open end of the shield to a very small area. Also the shield has a large enough diameter that the prongs 35 are not in contact with the heat source surface close to the position of the sensing tip 19. The fast millisecond response time of these right angle type thermocouples then assure a temperature reading which has eliminated error sources in the prior art thermocouple structures of the right angle type.

Having therefore improved the state of the art with a sensitive, rugged and accurate thermocouple structure, those features of novelty believed descriptive of the nature and spirit of the invention are defined with particularity in the following claims.

I claim:

1. An improved thermocouple assembly comprising in combination, a shaped thermocouple wire junction temperature sensing member mounted on a mounting structure means to extend a sensing tip beyond the mounting structure means, the sensing member defined by a juntion comprising pair of flattened strips of dissimilar metal joined together at a sensing tip to form a resilient sensing member for biasing the sensing tip against the surface whose temperature is to be monitored, and an open ended protective shield member carried by the mounting structure means and surrounding the sensing member, spring biasing means carried on said mounting structure means to bias the shield member toward an outer position in which the shield member surrounds the sensing tip and to permit movement of the shield member to an inner position at which an open end of the shield member is moved away from a position at which the shield member surrounds the junction to expose the junction at the open end for contact with a surface whose temperature is to be monitored, the movement of the shield member occurring as a result of pressure overcoming the spring bias and applied to the shield member by pressing the shield member against the surface being monitored with the open end of the shield member in contact with the surface whose temperature is being monitored, whereby the sensing member is protected by the shield member from physical contact with other surfaces and possible damage therefrom when the shield member is in its outer position.

2. The assembly of claim 1 wherein the protective shield is of a lower thermal conductivity material than that of the sensing member and has an open end shaped to present a plurality of prongs providing limited contact with the surface being monitored at a plurality of contact points, whereby the temperature of the surface being monitored is not substantially altered in the vicinity of the sensing tip when contact is made for a temperature measurement.

3. The assembly of claim 1 wherein the resilient sensing member includes a substantially circular loop with a welded overlapped junction of flattened strip conductors at an outer position relative to the mounting structure means and adjacent the open end of the shield member to flex the loop when contact is made between the sensing member and a surface and thereby maintain surface contact of the sensing tip with the surface as a result of the resiliency of the loop.

4. An improved right angle type thermocouple temperature sensor assembly comprising in combination, sensing tip base mount structure, a flat thermocouple sensing tip extending from the base mount structure and in the form of a resiliently shaped loop of conductor members terminating in a welded junction of two overlapped conductor ribbons to define a flat sensing tip surface adapted for area contact with a surface whose temperature is to be monitored, the junction being spaced from the base mount structure and contacting the surface whose temperature is to be monitored with a pressure based upon deflection of the loop and established by the resiliency bias of the loop, and a resiliently biased open ended protective shield mounted on the base mount structure and about the loop, the shield being movable between two limiting positions for respectively permitting engagement of the sensing tip against a surface to be monitored at one limiting position and for surrounding the sensing tip in a protected position within the shield at the other limiting position.

5. The assembly of claim 4 wherein the shield includes a cylindrically shaped member of a lower thermal conductivity material than that of the sensing tip and having a plurality of circumferentially spaced prongs defining the open end and adapted to contact the surface to be monitored at spaced points without substantially altering the surface temperature being sensed by the sensing tip when in contact with that surface.

6. The assembly of claim 4 wherein the sensing tip includes two dissimilar metal wires flattened into ribbon ends having a thickness of about 0.0035 inches and having a width of about 0.1 inch, the ribbon ends being overlapped and welded together to form a thermocouple junction.

7. An improved thermocouple comprising in combination, a mounting structure for supporting a thermocouple sensing tip, a loop extending freely from the mounting structure to form the sensing tip defined by a junction of two dissimilar flat metal ribbons joined by welding at their ends into a ribbon shaped junction, the loop forming a shaped resilient loop with a spring contact bias of predetermined magnitude that establishes a contact pressure between a surface being monitored and the junction, and shield means carried by the mounting structure and surrounding the loop, the shield means movable between an inner position and an outer position relative to the mounting structure to protect the loop and to limit deflection of the loop when the sensing tip is placed against the surface being monitored.

* * * * *